United States Patent
Nair et al.

(10) Patent No.: US 7,146,607 B2
(45) Date of Patent: Dec. 5, 2006

(54) METHOD AND SYSTEM FOR TRANSPARENT DYNAMIC OPTIMIZATION IN A MULTIPROCESSING ENVIRONMENT

(75) Inventors: Ravi Nair, Briarcliff Manor, NY (US); John Kevin O'Brien, South Salem, NY (US); Kathryn Mary O'Brien, South Salem, NY (US); Peter Howland Oden, Ossining, NY (US); Daniel Arthur Prener, Croton-on-Hudson, NY (US)

(73) Assignee: International Business Machines Corporation, Armonk, NY (US)

(*) Notice: Subject to any disclaimer, the term of this patent is extended or adjusted under 35 U.S.C. 154(b) by 521 days.

(21) Appl. No.: 10/244,564

(22) Filed: Sep. 17, 2002

(65) Prior Publication Data

US 2004/0054992 A1 Mar. 18, 2004

(51) Int. Cl.
*G06F 9/45* (2006.01)
(52) U.S. Cl. ........................ 717/151; 717/153
(58) Field of Classification Search ................ 717/153, 717/158, 151, 138
See application file for complete search history.

(56) References Cited

U.S. PATENT DOCUMENTS

| | | | |
|---|---|---|---|
| 4,564,903 A | 1/1986 | Guyette et al. | |
| 5,440,710 A | 8/1995 | Richter et al. | |
| 5,481,684 A | 1/1996 | Richter et al. | |
| 5,574,878 A | 11/1996 | Onodera et al. | |
| 5,574,922 A | 11/1996 | James | |
| 5,619,665 A | 4/1997 | Emma | |
| 5,668,969 A | 9/1997 | Fitch | |
| 5,675,762 A | 10/1997 | Bodin et al. | |
| 5,678,032 A | 10/1997 | Woods et al. | |
| 5,751,982 A | 5/1998 | Morley | |
| 5,768,593 A | 6/1998 | Walters et al. | |
| 5,832,205 A | 11/1998 | Kelly et al. | |
| 5,905,998 A | 5/1999 | Ebrahim et al. | |
| 5,983,012 A | 11/1999 | Bianchi et al. | |
| 6,031,992 A | 2/2000 | Cmelik et al. | |
| 6,075,937 A | 6/2000 | Scalzi et al. | |
| 6,075,938 A | 6/2000 | Bugnion et al. | |
| 6,091,897 A | 7/2000 | Yates et al. | |
| 6,134,515 A | 10/2000 | Skogby | |
| 6,158,049 A * | 12/2000 | Goodwin et al. | ........... 717/158 |
| 6,189,141 B1 | 2/2001 | Benitez et al. | |
| 6,289,419 B1 | 9/2001 | Takahashi | |

(Continued)

FOREIGN PATENT DOCUMENTS

JP 08-234981 9/1996

(Continued)

OTHER PUBLICATIONS

"A framework for remote dynamic program optimization", M. J. Voss and R. Eigenmann, Proceedings of the ACM SIGPLAN workshop on Dynamic and adaptive compilation and optimization table of contents pp. 32-40, 2000, pp. 32-40, ISBN: 1-58113-241-7.*

(Continued)

*Primary Examiner*—Wei Zhen
*Assistant Examiner*—Philip Wang
(74) *Attorney, Agent, or Firm*—Satheesh Karra, Esq.; McGinn IP Law Group, PLLC (57) ABSTRACT

A method (and system) of transparent dynamic optimization in a multiprocessing environment, includes monitoring execution of an application on a first processor with an execution monitor running on another processor of the system, and transparently optimizing one or more segments of the original application with a runtime optimizer executing on the another processor of the system.

45 Claims, 6 Drawing Sheets

U.S. PATENT DOCUMENTS

| | | | |
|---|---|---|---|
| 6,339,752 B1 | 1/2002 | Mann et al. | |
| 6,341,371 B1* | 1/2002 | Tandri | 717/158 |
| 6,351,844 B1 | 2/2002 | Bala | |
| 6,381,682 B1 | 4/2002 | Noel et al. | |
| 6,430,657 B1 | 8/2002 | Mittal et al. | |
| 6,463,582 B1 | 10/2002 | Lethin et al. | |
| 6,480,845 B1 | 11/2002 | Egolf et al. | |
| 6,728,950 B1 | 4/2004 | Davis et al. | |
| 6,763,328 B1 | 7/2004 | Egolf et al. | |
| 6,763,452 B1 | 7/2004 | Hohensee et al. | |
| 6,915,513 B1* | 7/2005 | Duesterwald et al. | 717/168 |
| 6,961,806 B1 | 11/2005 | Agesen et al. | |
| 2002/0066086 A1 | 5/2002 | Linden | |
| 2002/0104075 A1* | 8/2002 | Bala et al. | 717/136 |
| 2002/0147969 A1* | 10/2002 | Lethin et al. | 717/138 |
| 2002/0199172 A1* | 12/2002 | Bunnell | 717/128 |
| 2003/0093780 A1* | 5/2003 | Freudenberger et al. | 717/153 |
| 2003/0171907 A1* | 9/2003 | Gal-On et al. | 703/14 |

FOREIGN PATENT DOCUMENTS

| | | |
|---|---|---|
| JP | 08-272686 | 10/1996 |
| WO | WO 95/16967 | 6/1995 |

OTHER PUBLICATIONS

"Using Annotation to Reduce Dynamic Optimiation Time", C. Krintz and B. Calder, 2001 ACM ISBN-158113-414-2/01/06, pp. 156-167.*

"Prototype real-Time monitor: Design" R. Van Scoy et al., Technical Report CMU/SEI-87-TR-038 ESD-TR-87-201, Nov. 1987.*

Computer Dictionary, Third Edition, Microsoft Press, 1997, excerpts including p. 467.*

Turley, J., "Alpha Runs x86 Code with FX!32", Microprocessor Report, Mar. 5, 1996.

May, C., "Mimic: A Fast System/370 Simulator",Proceedings of the Object Oriented Programming Systems Languages and Applications Conference (OOPSLA), Orlando, FL, Oct. 4-8, 1987, Special Issue of Sigplan Notices, Dec. 1987, vol. 22, No. 7, Jun. 24.

Magnusson, P.S., "A Design for Efficient Simulation of a Multiprocessor", Proceddings of the First International Workshop on Modeling, Analysis, and Simulation of computer and Telecommunication Systems (MASCOTS), La Jolla, CA Jan. 1993, pp. 69-78.

Lamport, I., "How to Make a Multiprocessor Computer that Correctly Executes Multiprocess Programs", IEEE Transactions on Computers, C-28, Sep. 9, 1979, pp. 690-691.

Adve, S., et al., "Shared Memory Consistency Models: A Tutorial", IEEE Computer, vol. 29, No. 12, Dec. 1996, pp. 66-76.

Herrod, S.A., "Using Complete Machine Simulation to Understand Computer System Behavior", Ph.D. Thesis, Stanford University, Feb. 1998.

Nichols, B., et al., "Pthreads Programming: A POSIX Standard for Better Multiprocessing" (O'Reilly Nutshell), Sep. 1996.

Bala, V., et al., "Dynamo: A Transparent Dynamic Optimization System", *Conference on Programming Language Design and Implementation*, 2000, pp. 1-12.

Burke, M.G., et al., "The Jalapeno Dynamic Optimizing Compiler for JavaTM", *IBM Thomas J. Watson Research Center Technical Paper*, Mar. 1999, 13 pages (published 1999 ACM Java Grande Conference Proceedings, San Francisco, CA, Jun. 12-14, 1999).

Ball, T., et al., "Efficient Path Profiling", *IEEE Proceedings of MICRO-29*, Dec. 2-4,1996, pp. 1-12.

IBM, "Low-Synchronization Translation Lookaside Buffer Consistency Algorithm" (ID NB9011428), IBM Technical Disclosure Bulletin, Nov. 1990 vol. 33 Issue 6B p. 428-433.

Hoogerbrugge et al., "Pipelined Java Virtual Machine Interpreters", 2000 (15 pages).

University of Queensland, "The University of Queensland Binary Translator (UQBT) Framework", 2001, 326 page (34 pages extracted). Online version can be obtained at <www.experimentalstuff.com/Technologies/uqbt/uqbt.pdf>.

"Java Multithreading" David Nelson-Gal et al., Jun. 1, 1998, Java Developer's Journal, pp. 1-4, http://jdj.sys-con.com/read/35997,htm.

Julian Brown, "ARMphetamine—A Dynamically Recompiling ARM Emulator", May 2000, 97 pages (36 pages extracted). Online version can be obtained at <http://armphetamine.sourceforge.net/diss.ps>.

* cited by examiner

METHOD AND SYSTEM FOR TRANSPARENT DYNAMIC OPTIMIZATION IN A MULTIPROCESSING ENVIRONMENT

CROSS-REFERENCE TO RELATED APPLICATION

The present application is related to U.S. patent application Ser. No. 10/244,434, filed on Sep. 17, 2002, to Nair et al., entitled "METHOD AND SYSTEM FOR EFFICIENT EMULATION OF MULTIPROCESSOR MEMORY CONSISTENCY", to U.S. patent application Ser. No. 10/244,414, filed on Sep. 17, 2002, to Altman et al., entitled "METHOD AND SYSTEM FOR MULTIPROCESSOR EMULATION ON A MULTIPROCESSOR HOST SYSTEM", to U.S. patent application Ser. No. 10/244,682, filed on Sep. 17, 2002, to Nair et al., entitled "HYBRID MECHANISM FOR MORE EFFICIENT EMULATION AND METHOD THEREFOR", and to U.S. patent application Ser. No. 10/244,559, filed on Sep. 17, 2002, to Nair et al., entitled "METHOD AND SYSTEM FOR EFFICIENT EMULATION OF MULTIPROCESSOR ADDRESS TRANSLATION ON A MULTIPROCESSOR HOST", each assigned to the present assignee, and incorporated herein by reference.

BACKGROUND OF THE INVENTION

1. Field of the Invention

The present invention generally relates to software systems, and in particular to methods for improving the tuning of such systems to improve their performance.

2. Description of the Related Art

Building a typical software system encompasses a number of steps and culminates in the production of a bound module (or "executable binary") which has been tuned to execute on a specific hardware and software configuration. This process, known as "static optimization", may include the steps of compiling the program with optimization and inserting instrumentation, static or dynamic binding with pre-built runtime libraries, testing with some range of expected user input on some sample of expected user configurations, and recompilation with optimization based on data collected during testing (this is referred to as "optimizing by means of profile directed feedback").

The program which results is expected to be both robust and optimal across the range of expected user configurations and input data. In reality, however, the spectrum of user environments may be so broad as to prevent such programs from achieving their optimum performance in all cases.

It has long been recognized that static techniques (i.e., the gathering of information about code execution outside the operational environment to allow fine-tuning of code for subsequent executions) are inadequate for generating efficient code because it is difficult, if not impossible, to generate test data representing all possible end-user data and hardware configurations.

Moreover, as instruction-level parallelism increases and pipelines deepen, this inadequacy becomes increasingly an irritant.

An alternative to static optimization is "dynamic optimization." Dynamic optimization is similar to static optimization with profile-directed feedback in that it includes the steps of instrumenting the code to be optimized, compiling it, and statically or dynamically binding it with run time libraries.

However, dynamic optimization differs from static optimization in that the instrumented code is observed during live execution with actual user data and that the executing code is re-optimized in situ (i.e., the information about program execution thus gathered is used during the same execution to re-optimize the code for subsequent (within the same run) execution).

The resulting optimized code from dynamic optimization is often more efficient than achievable with static optimization techniques because optimization can be focused, for instance, on those heavily utilized portions of the code whose increased efficiency will affect overall performance as indicated by actual program use.

In addition, with dynamic optimization there is no requirement for a customer to perform the labor-intensive tasks of generating hypothetical data sets.

However, in prior dynamic optimization systems, the drawback to dynamic optimization is that the information gathering and compilation work that must be performed is interspersed sequentially with the execution of the application code, thus adding to the execution time of the application. This additional cost must be outweighed by the improvement achieved in the running time of the application in order for any benefit to accrue from the dynamic optimization.

Examples of dynamic optimization include the techniques that have been proposed which seek to optimize the execution of Java® applications by performing dynamic compilations and optimization of Java® bytecodes. The key with such techniques is that since the typical bytecode execution is significantly slower than most compiled applications, the overhead of the runtime processing may be absorbed by a modest improvement in execution. Such opportunities are rarely available in the execution of highly optimized non-Java (binary code) applications.

Moreover, many of the techniques employed, such as optimizing method calls, are not generally applicable.

Other projects, such as the one described in V. Bala, et al., "Transparent Dynamic Optimization: the design and implementation of Dynamo" HPL 1999-1978 990621, have addressed the issue of dynamically improving runtime performance by rearranging code layout to improve instruction cache locality, under the assumption that the overhead can be repaid by the resulting improvements in execution time.

The Dynamo technique, however, does not take advantage of instrumentation information, nor, since it is designed for uniprocessor systems, does it consider multiprocessor applications.

However, computer systems today are typically comprised of more than one processor. Even at the low end, single chip multiprocessors are becoming ubiquitous. It is also frequently the case that in many of these configurations, at least one of the processors is underutilized. Earlier attempts to exploit multiprocessor capability to improve program execution have focused on techniques such as automatic parallelization of applications. These techniques have met with limited success for a variety of reasons, the most significant of which are: automatic parallelization is most relevant to numeric intensive applications, especially those written in Fortran; commercial transaction processing applications, typically written in C, have proven less amenable to this approach; and automatic parallelization has proven difficult to implement in practice, even for the more regular types of code.

Thus, clearly there is a need for an optimization process that can take advantage of the unique properties of multiprocessor systems for a broad category of codes.

SUMMARY OF THE INVENTION

In view of the foregoing and other problems, drawbacks, and disadvantages of the conventional methods and structures, an object of the present invention is to provide improved program execution efficiency in multiprocessor systems by taking advantage of the opportunistic use of one or more idle or underutilized processors.

It is another object of the invention to improve the performance of software systems by learning of their execution characteristics, and applying this knowledge to tune and enhance the execution behavior on the current host system, in a manner that is transparent to a user of the system.

Specifically, the present invention seeks to improve on the conventional methods and systems by employing available cycles in a symmetric or distributed multiprocessor system to effect this performance enhancement, without impeding the execution of the application to be optimized.

In a first aspect of the present invention, a method (and system) of transparent dynamic optimization in a multiprocessing environment, includes monitoring execution of an application on a first processor with an execution monitor running on another processor of the system, and transparently optimizing one or more segments of the original application with a runtime optimizer executing on the another processor of the system.

In a second aspect of the invention, a method for a multiprocessor computing environment to perform simultaneous, dynamic optimization of an application with respect to its execution environment, includes executing an instrumented copy of the application on a first processor in the system, monitoring the execution of the application with an execution monitor running on another processor of the system, the monitoring being conducted with reference to the execution characteristics produced by executing instrumentation code included in the instrumented copy of the application, optimizing one or more segments of the original application with a runtime optimizer executing on another processor of the system, the optimization being conducted with reference to execution characteristics gathered by the execution monitor, and without performance impact to the concurrently executing application, modifying the original execution application by replacing one or more segments with the recently optimized segment, the modification being conducted in a manner that is transparent to a user of the application.

In a third aspect of the invention, a method for performing simultaneous, dynamic optimization of an application with respect to its execution environment, in a multiprocessor system, includes monitoring each execution of a program or application running in a first processor, by an execution monitor, running in a separate processor or as a separate process running across multiple processors, creating, by binary code as it executes, a profile data of execution characteristics of the binary code, the binary code containing instrumentation code for monitoring performance, continuously evaluating, by the execution monitor, the profile data; and when a given threshold condition is satisfied, invoking a dynamic optimizer to optimize frequently executing code fragments, the optimized code fragments being inserted in the executing instruction stream for use in a subsequent execution thereof.

In a fourth aspect of the invention, a method of transparent dynamic optimization in a shared multiprocessing (SMP) system, includes executing an application binary on a first processor, monitoring, on another processor in the system, a behavior of the execution, and optimizing the execution of the application binary while the application binary is executing.

In a fifth aspect of the invention, a system for transparent dynamic optimization in a multiprocessing system, includes an execution monitor for monitoring execution of an application binary on a first processor, the execution monitor running on another processor of the system, the execution monitor including a dynamic optimizer for simultaneously, with the monitoring, optimizing one or more segments of the original application binary, the optimizer executing on the another processor of the system.

In a sixth aspect of the invention, a signal-bearing medium tangibly embodying a program of machine-readable instructions executable by a digital processing apparatus to perform a method of transparent dynamic optimization in a multiprocessing system, the method includes monitoring execution of an application binary on a first processor with an execution monitor running on another processor of the system, and transparently optimizing one or more segments of the original application binary with a runtime optimizer executing on the another processor of the system.

Thus, with the invention, preferably excess processing cycles in a multiprocessing system are used to observe the execution characteristics of an executing application, and transparently modify that running system to significantly improve its performance.

Preferably, each execution of a program or application is "shadowed" by an execution monitor, running in a separate processor or as a separate process running across multiple processors. As it executes, the binary code, which contains instrumentation code designed to monitor performance, creates a profile of its execution characteristics. The execution monitor continuously evaluates the profile data, and when a given threshold condition is satisfied, invokes a dynamic optimizer of the present invention to optimize (or re-optimize) frequently executing code fragments, which are then inserted in the executing instruction stream where they will be used in subsequent execution. The newly inserted code fragment will either contain no instrumentation, or may have been "re-instrumented" to detect further changes in the execution characteristics of the application.

The invention applies the above technique to binary executables as opposed to Java bytecodes, which, since they are interpreted, execute slowly enough to amortize the cost of optimization. (Notwithstanding, this same technique is also effective for bytecode applications). That is, the binary is instrumented in such way that while it is running, one can, on another processor in a shared multiprocessor (SMP) system, monitor the behavior of the execution and optimize it while it is executing, but on the separate processor.

BRIEF DESCRIPTION OF THE DRAWINGS

The foregoing and other purposes, aspects and advantages will be better understood from the following detailed description of a preferred embodiment of the invention with reference to the drawings, in which:

FIGS. 5A–5C illustrate an annotation file created during the method 400 of FIG. 4, and specifically

DETAILED DESCRIPTION OF PREFERRED EMBODIMENTS OF THE INVENTION

Referring now to the drawings, and more particularly to FIGS. 1–8, there are shown preferred embodiments of the method and structures according to the present invention.

Preferred Embodiment

Generally, the present invention exploits multiprocessing capability in a new way to achieve significant performance improvement in the execution of programs on multiprocessor systems. Purely static compilers generally assume that all paths in a program are equally likely to be taken and therefore typically optimize all possible paths to the same extent. However, since some paths may, in practice, be taken more often, optimization may be more beneficial if key paths are selected for optimization, even at the expense of slowing less-frequently taken paths.

On the other hand, purely dynamic compilers (such as most just-in-time (JIT) compilers for Java® bytecode programs), while being possessed of detailed information regarding the current execution of a program, are severely hampered by the exigencies of needing to use this intelligence within a narrow temporal window.

As will become evident below, the present invention has two advantages over known dynamic compilers.

First, it need not, in effect, operate in such a constrained duration, because of its multiprocessor design. Further, it can make use of static optimization output while performing optimization operations in order to reduce the requirements for program analysis during execution.

Furthermore, essentially all systems in the not-too-distant future are expected to be built from single-chip multiprocessors, thus making the inventive approach uniquely relevant.

In a preferred embodiment of the invention to be described here, it is assumed that the dynamic runtime optimization system (or "dynamic optimizer"), which comprises those methods to monitor code execution, optimize code based on collected execution information, and re-insert optimized code into the program, may execute in a processor (or group of processors) separate from the processor (or group of processors) executing the program being monitored, as sub threads or processes under the control of a continuously running execution monitor.

Further, the executing code to be optimized will have been compiled to incorporate instrumentation code using, for example, the technique described in Ball, et al., "Efficient Path Profiling", Proceedings of MICRO 1996, December 1996. Thus, the invention assumes that the executing binary code has been already instrumented (e.g., either statically or dynamically), as is well known in the art.

A primary focus of the present invention is the exploitation of the information produced by that instrumentation code in a novel way.

It is noted that, although the descriptions outlined above assume an SMP environment, the present invention also applies to a computer system made up of a cluster of one or more processors communicating via distributed shared memory. In such a configuration, the dynamic optimization system would execute on either a single (or multiple) node(s) in the cluster, or one (or more) processor of a node in the cluster, so long as they are distinct from the nodes or processors executing the code to be optimized.

Hereinbelow, the invention will be described in detail with reference to FIG. 1, which illustrates a dynamic optimizer running on a multiprocessing hardware system 100.

Figure 1:
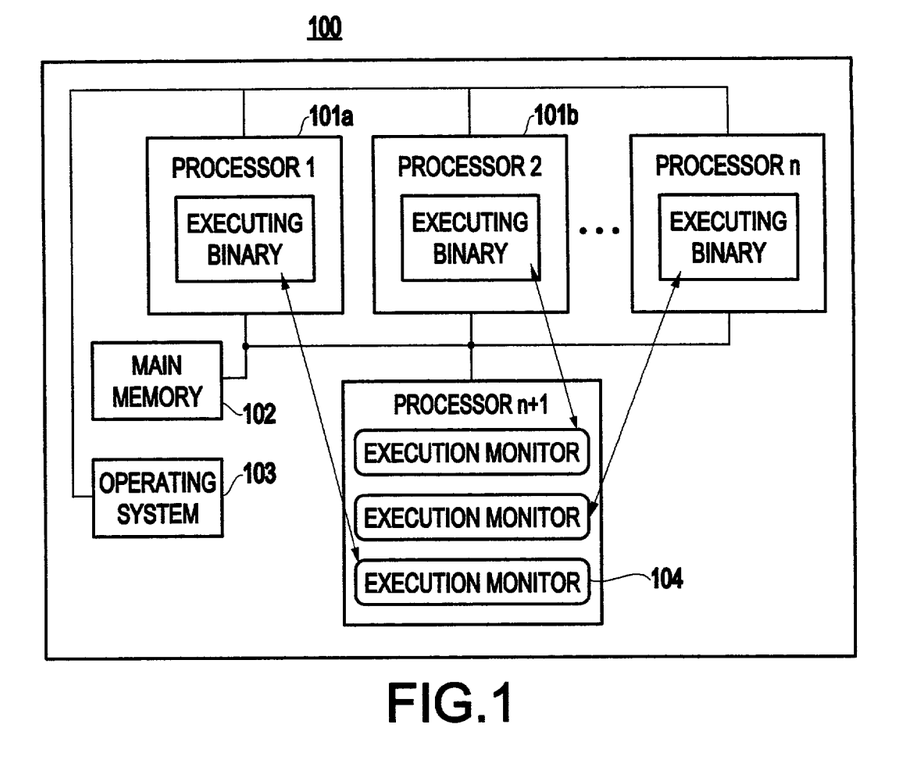
FIG. 1 illustrates a system view of a multiprocessing system 100 for running the present invention.

The multiprocessing system 100 may comprise any number of processors 101a, 101b, etc. greater than one, each processor being respectively labeled 1 to n+1 in FIG. 1. Each processor may have its own local memory (not shown in FIG. 1), and all processors can communicate through a shared main memory 102. The system is controlled by an operating system 103 that either contains or supports a thread scheduling package.

For every instrumented program (e.g. executing binary) that executes under the dynamic optimization process of the present invention, a simultaneous execution monitor thread is spawned in an execution monitor 104, to be described in detail below.

The purpose of the execution monitor thread is to analyze the execution behavior of the given executing instrumented binary, and further to this analysis, to make changes (optimizations) which preserve the expected outputs of the application, while reducing the time taken to produce them. This (monitor) thread executes only as long as the application which it is monitoring.

Thus, FIG. 1 shows that there are 1 to n processors executing real applications, each one which is potentially distinct from all the others, and at least one other processor n+1 (e.g., which may be multiple other processors such as n+2, etc. but only one being shown for brevity). There is one execution monitor 104 associated with each of the instrumented binaries executing on processors 1 to n. They need not all run only on processor n+1. They could run on a different processor(s) depending upon how many resources such execution monitors 104 are using up. However, there is a one-to-one relationship between the number of execution monitors and the number of instrumented binaries executing on processors 1 to n.

It is noted that there may be more than one instrumented binary executing on more than one processor of an SMP. The relationship described herein is between just such an instrumented binary and its own "shadow" process (e.g., described below and shown in FIG. 2 with reference numerals 201a and 205). This is the one-to-one relationship that the invention is concerned with and advantageously utilizes, and the invention requires only that the shadow process for a given instrumented binary execute on a separate processor.

Thus, as processor 1 (101a) is executing its binary, the characteristics of processor 1's execution is observed by a dedicated execution monitor 104.

Figure 2:
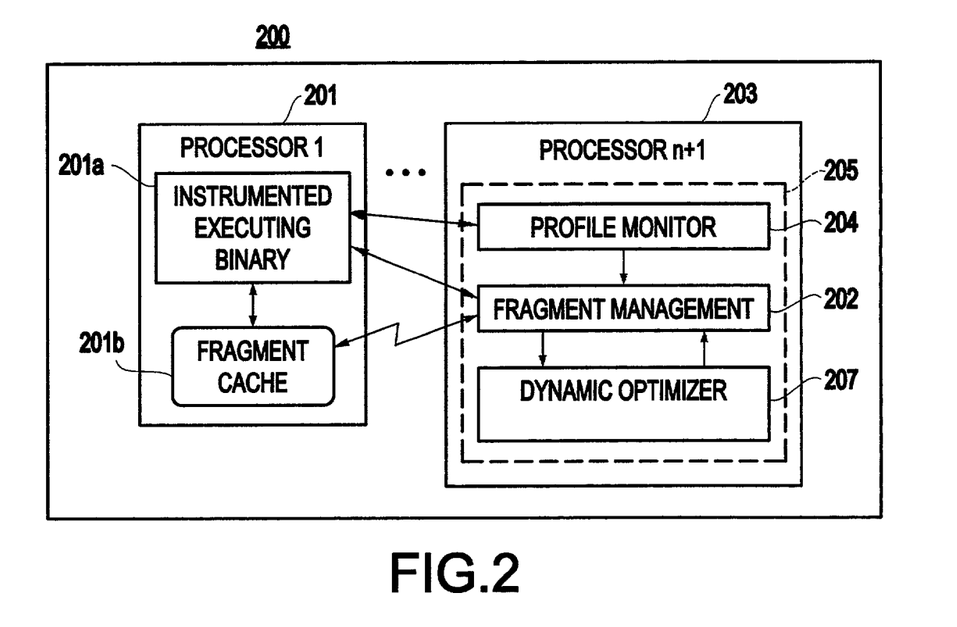
FIG. 2 illustrates an enhanced view 200 of a processor 201 for running an instrumented binary 201*a* and a processor 203 for running a dynamic optimizer 207 in accordance with the invention.

FIG. 2 is a conceptual view 200 of the interaction between an instrumented binary application 201a to be optimized executing on a first processor 201 and an execution monitor thread 205 that monitors the execution of the instrumented binary application 201a, the execution monitor being executed on processor 203 that is distinct from processor 201.

In FIG. 2, the executing instrumented binary may be comprised of a fairly large system which executes over a long period of time. Herein, the method whereby the executing instrumented binary is monitored and modified during execution is referred to, as a "shadow" process. This shadow process includes using an execution monitor, a dynamic optimizer, and a fragment table (or cache) manager. On startup of the instrumented binary, this "shadow" process is forked, and continues to execute for the duration of the execution of the instrumented binary or application.

Shadow process 205, also includes a fragment cache 201b. It is noted that the fragment cache 201b is a software artifact of the shadow process, which is used for storing code fragments after optimization, pending their re-insertion in the executing code stream. The size of this data structure is significant, and it is managed by the "fragment cache manager" for storing dynamically re-optimized fragments of the instrumented binary application 201a.

These "fragments" are sequences of frequently executed instructions (as determined by the execution monitor thread, based on its analysis of the instrumentation produced by the instrumentation code) which subsequently may be executed by processor 201 as part of the application, and which have been selected during the execution or profile monitoring step (204) of the "shadow" process when it has determined that optimization of that fragment might result in more efficient program execution.

It is noted that only selected portions of the executing binary are stored in the fragment cache 201b. These portions are selected based on the output of the instrumentation. Essentially, they include sequences of frequently executed instructions, with some additions or deletions deemed necessary and acceptable by the optimization functions.

The execution or profile monitor 204 may monitor various characteristics including the number of times that a particular path through the program was executed. Hence, if a path was executed a large number of times (e.g., 1000 times or more), then it triggers a fragment manager 202 to start to do something about this path and to begin an optimizing process (using a dynamic optimizer 207 as discussed below) on this particular piece of code.

Thus, processor 203 also runs a dynamic optimizer thread 207 as part of shadow process thread 205 for optimizing the selected fragments from the instrumented binary application, and passes the optimized fragments back to the fragment cache 201b via the fragment manager 202.

In the context of the example above regarding monitoring how many times the path of a program has been executed and whether such execution has occurred more than a threshold number of times (e.g., more than a 1000 times), the fragment manager 202 acts to extract that path (e.g., a part or "fragment" of the executing binary, which is a relatively small chunk of code) or a portion of the path, from the fragment cache 201b for optimization (or re-optimization) by the dynamic optimizer 207.

Hence, the fragments are taken out, optimized and then replaced (put back) into the running binary. The fragment manager 202 decides which piece of the path should be optimized. It is likely not to be the whole path. The fragment manager 202 "extracts" the piece of the path by making a copy of the, instruction(s), and storing the instructions such that the optimizer 207 can look at the copy and make changes to the copy.

As such, the fragment manager 202 "tells" the optimizer 207 to perform such an optimization, and gives it the profile information which the fragment manager 202 believes are relevant for that fragment. The optimizer will then work on the fragment to optimize it (e.g., reorders code, etc. to make it quicker and more efficient), and, when done, will notify the fragment manager 202. Then, the fragment manager 202, using data stored in its own internal tables, determines the correct logical location at which to re-insert the optimized fragment in the original executing binary in processor 1 (201).

Then, the optimized fragment is placed in the fragment cache 201b on processor 1 (201), and the fragment manager 202 will modify the executing binary, such that the next time that the same path (instruction(s)) (or portion of the path, as the case may be) is encountered for execution in the executing binary, then the piece of code in the fragment cache 201b will be picked up for execution, instead of the code in the original executing binary.

It is noted that the fragment manager 202, in the first instance, will extract the piece of the path directly from the instrumented executing binary 201a, whereas in a later stage (e.g., a re-optimization of the path), the fragment manager 202 would extract it from the fragment cache 201b instead of directly from the instrumented executing binary 201a.

Hence, the fragments may appear in two forms: as real code sequences in the original binary (or later, the dynamically optimized binary) and again as the re-inserted optimized code sequences that the dynamic optimizer has produced. The latter appear in the fragment cache 201b, the former (except in the parenthetical case above) appear in the original application. For each executing instrumented binary application, there will be one instance of an execution monitor thread (shadow process thread) 205, the execution monitor for a given instrumented binary application being referred to herein as its "monitoring thread."

The operation of the execution monitor (or shadow process) thread 205 proceeds in parallel with, but unknown to the application, whose execution proceeds unchanged, except for the production of a profile stream characterizing its own execution characteristics.

It is noted that "execution characteristics" represent profile data produced by the instrumented binary as a side effect of execution.

Further, it is noted that the fragment cache 201b is merely a data structure or table, residing in shared memory, allocated and controlled by the fragment manager 202 of the execution monitor thread 205. As noted above, a fragment is a sequence of instructions whose execution characteristics have made it a potential for (re) optimization; this sequence of instructions will be extracted from the executing binary by the execution monitor (shadow process) 205, optimized and stored in the fragment cache for later re-insertion into the binary.

Further, it is noted that since the goal is to optimize and re-insert these fragments into the executing binary, their residence in the fragment cache 201b is transient, and standard techniques are employed to manage and reclaim the storage therein.

The Method of the Invention

Figure 3:
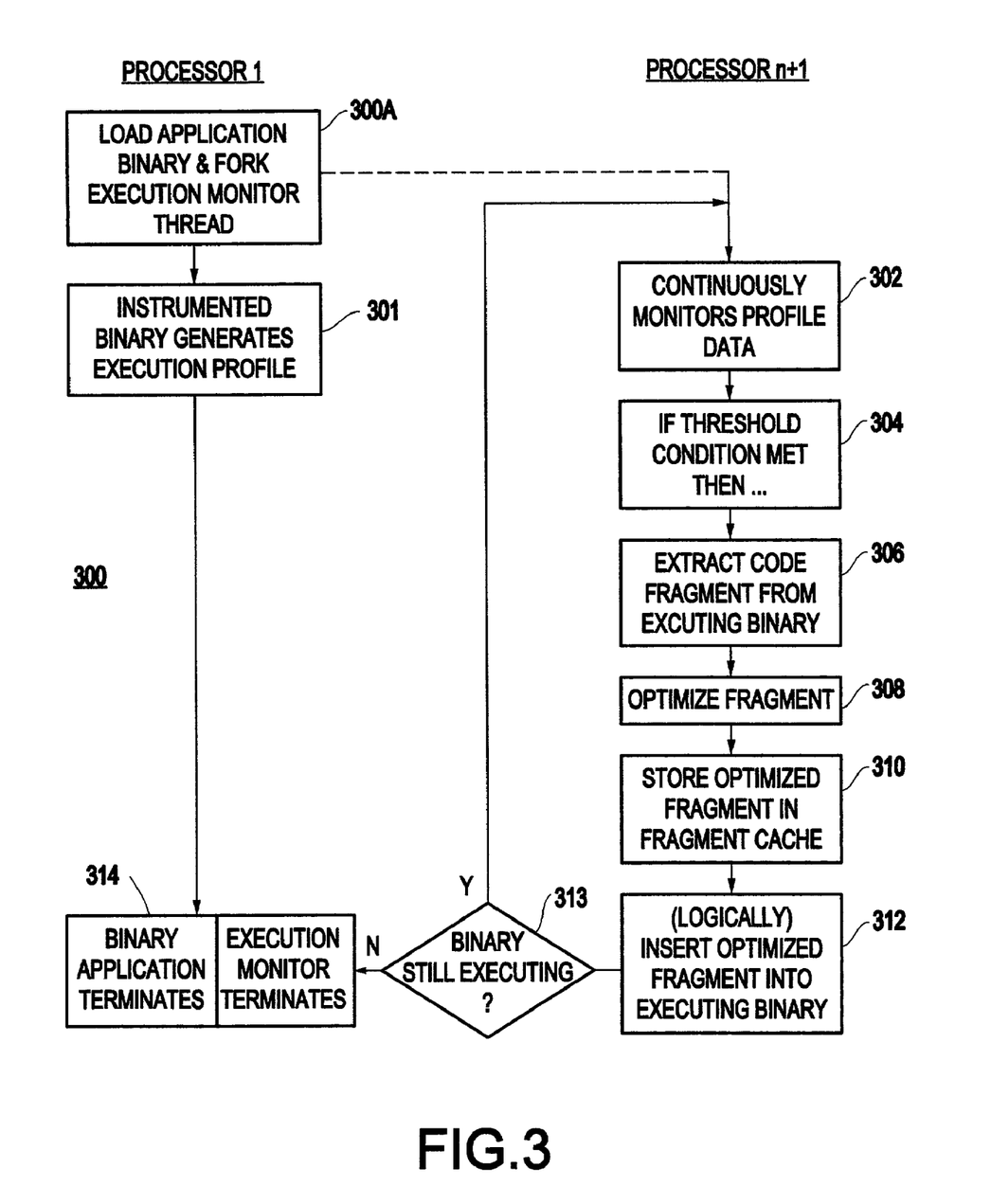
FIG. 3 is a flow diagram depicting the process 300 of dynamic optimization in accordance with the invention.

FIG. 3 is a flow diagram depicting the steps of a method 300 performed by the system of FIG. 2 in connection with the dynamic optimization process of the present invention.

In method 300, upon loading the instrumented binary in processor 201, a fork is executed to start up the execution monitor thread in processor 203(n+1) of FIG. 2 (step 300A).

Further, upon loading of the instrumented binary application, an execution monitor thread is spawned (forked) at step 301 for execution on processor 203 (n+1) of FIG. 2 concurrently with the execution of the instrumented binary application on processor 201. As mentioned above, the execution monitor thread is also referred to as a "shadow thread" since it watches or monitors the execution of the instrumented binary.

Spawning of the shadow process (execution monitor) thread is effected by execution of a FORK or some such Operating System (OS) primitive. Again, the parallel nature of this activity is noted. This parallelism is important because it permits more aggressive techniques and forgives timing errors, in that the instrumented binary application running on processor 201 is unaware of the analysis and optimization process and so is never required to wait (unlike the Dynamo or Java® JIT case mentioned above). While the instrumented binary application could be a program designed for benchmarking, the real benefits from this system are achieved when it is used alongside actual user applications, executing actual user data.

At step 302, which is performed as part of execution of the instrumented binary, an execution profile is generated. The execution profile describe execution characteristics of the executing binary (or running program). These characteristics are determined by the particular instrumentation code inserted into the binary application. Examples of characteristics that instrumentation code might be designed to monitor include the number of times a particular loop in the application is performed, or more particularly, the number of times a particular path, or sequence of code blocks, is executed.

It is noted that the profile data is produced by the instrumented application in shared memory, and the shadow process (execution monitor) thread reads it out of the same shared memory locations. The monitor thread does not critically depend on the absolute values of any of the profile counters (e.g., 10,000 executions of a loop and 10,001 or even 11,000 are not significantly different) and so there is no need for locking or other synchronization between the application thread and the monitor thread.

As described below, the information is provided continuously, as it is generated. Hence, this is a dynamic process, and as such the information is provided continuously, such that the executing code can actually be modified while execution is taking place.

Hence, the generated profile information (e.g., also referred to as "execution characteristics") is continuously monitored at step 302 by the execution monitoring thread 205 of FIG. 2 operating on processor 203, the monitoring thread 205 being associated exclusively with the instrumented binary application currently under examination.

For purposes of describing the current embodiment, it is assumed the monitoring thread runs on a single processor distinct from the processor executing the instrumented binary application under examination. However, the invention contemplates that the monitoring thread may be executed across multiple processors so long as those processors are distinct from the processor executing the instrumented binary application.

At step 304, the shadow process (execution monitor) 205 examines the generated profile data, to determine whether a threshold condition has been met. As such, in the exemplary embodiment, a counter or an incrementer/decrementer could be employed. Alternatively, in different embodiments, a different structure could be used. For example, a combination of a counter and some other device (or a combination of counters in which a sum of the counters goes to a certain value, which in turn indicates a certain condition) could be used depending upon what the threshold value is being measured, or the complexity of the conditions or threshold being measured, etc. Typically, the thresholds employed are set when the instrumentation is inserted, and they are decremented on execution, so reaching zero triggers the invocation of the optimizer 207. Further, typically the "threshold" will be associated with some type of count or number (e.g., number of times that the same code has been encountered, etc.), as opposed to some other type of value being measured.

The optimizer 207 preferably is a form of generic compiler optimizer. It is aware that it is executing at runtime, and, as such, must execute in less time than a typical compile-time optimizer, but other than that it is not in any way specialized to the binary application that it is optimizing.

The dynamic optimizer 207 typically analyzes the particular sequence of instructions comprising the "fragment" it has been invoked to operate on, and improves the performance by, for example, regrouping the instruction sequence to cover latencies which may occur if the underlying hardware is not the particular model for which the code was compiled. The dynamic optimizer 207 typically comes prepackaged with the dynamic compilation system. For example, it could be shipped as part of the computer's operating system (OS).

As long as no threshold is reached, the monitoring thread 205 will continue to examine instrumented output.

If a threshold is reached, then at step 306 that portion of the binary application that caused the threshold to be reached is extracted (e.g., copied by the fragment manager 202) from the instrumented binary, sent to the dynamic optimizer 207 for optimization, and subsequent to optimization stored in the fragment cache 201b for use in the future when the original (un-reoptimized) fragment would have otherwise been executed.

Next, in step 308, the fragment is optimized by the optimizer 207. As mentioned above, the optimization process applied is one of any number of standard optimization techniques applicable to optimizing code sequences at runtime. The preferred types of optimization are those which exploit information not known statically at compile time (e.g., that a given variable has a constant value at runtime).

Additionally, optimizations may be performed which speculate that a given variable has a constant value based on a preponderance of evidence that it does indeed have the assumed value. Of course, in such a case, provision must be made for the event that the speculation is incorrect. It is noted that such consideration is known to the art, but here the present inventors are applying it in a new context.

Optimization can include, for instance, removal of unnecessary branching from a frequently executed code path, or specializing an application to exploit the full architectural power of the particular network node on which it is currently running.

Basically, if an application has been compiled to run on an earlier model of a machine (or a less expensive one), and is in the current instance running on a later machine (or more expensive, high-end machine), there may be opportunities for further optimization.

For example, there may be new and more powerful instructions, or the current machine may have more instruction level parallelism (e.g., more functional units) than the one for which the application was originally compiled for. These eventualities (and in a networked world they are becoming increasingly likely) will lead to significant opportunities for dynamic re-optimization. Hence, this presents another reason for applying these techniques.

That is, in a networked world, there is a strong incentive to compile for the lowest common denominator model of a particular architecture, since then the application can run on a greater proportion of the computers in the network. However, this provides an incentive to lower the level of optimization (thus reducing performance) and the inventive techniques would be particularly useful in improving the running times of such applications.

The method 300 of FIG. 3 optionally allows for insertion of instrumentation code into the optimized fragment to allow subsequent monitoring. Such automatic insertion instrumentation code into the fragment is believed to be well-known and for brevity will not be described further herein. The above-mentioned Bala et al. article (among others) teach how to insert instrumentation.

After optimization in step 308 by the dynamic optimizer 207, at step 310, the optimized fragment is stored into the fragment cache 201b.

Then, at step 312, the optimized fragment is inserted into the instrumented binary in place of the non-optimized version, so that in the future it will be executed as part of the instrumented binary upon subsequent execution of the instrumented binary.

This insertion operation may be performed, for example, by patching the original binary to branch to the newly optimized fragment, and the optimized fragment, of course, would need to branch back to the instruction following the original (extracted) fragment. Other techniques could be used as well, as would be evident to one of ordinary skill in the art taking the present application as a whole.

Optionally, the instrumentation code can be removed from the fragment before it is inserted into the binary application. In this regard, the instrumentation code is not per se removed as it actually is not re-inserted. The instrumentation is quite stylized, and easily recognized, so that the application code can be readily distinguished from the instrumentation, and thus it is not difficult to avoid. Even were this not the case, it would not be difficult to cause the location of the instrumentation to be recorded in a known (or discoverable) location by the instrumenting agent.

After the optimized fragment is inserted into the executing binary in step 312, in step 313, it is determined whether the instrumented binary is still executing. If the instrumented binary is still executing (e.g., a "YES" in step 313), then the process loops back to step 302. If the instrumented binary is still executing (e.g., a "NO" in step 313), then the process proceeds to step 314.

In step 314, execution of the instrumented binary and the execution monitor (the shadow thread) terminates.

Thus, the execution of the binary and the shadow thread terminate together. Indeed, a key feature of the invention is that all the steps take place during execution.

It is noted that the two vertical flows shown in FIG. 3 are parallel operations, as mentioned above.

Second Embodiment

Another embodiment of the invention will now be discussed with reference to FIG. 4 and is an improvement over the process of FIG. 3, and specifically can be employed in step 308 of FIG. 3.

That is, in step 308 of FIG. 3, the dynamic optimizer 207 examines a fragment and analyzes the same to determine what optimization can be performed to optimize the fragment. This decision to optimize is based only on what the dynamic optimizer can observe at that time.

Figure 4:
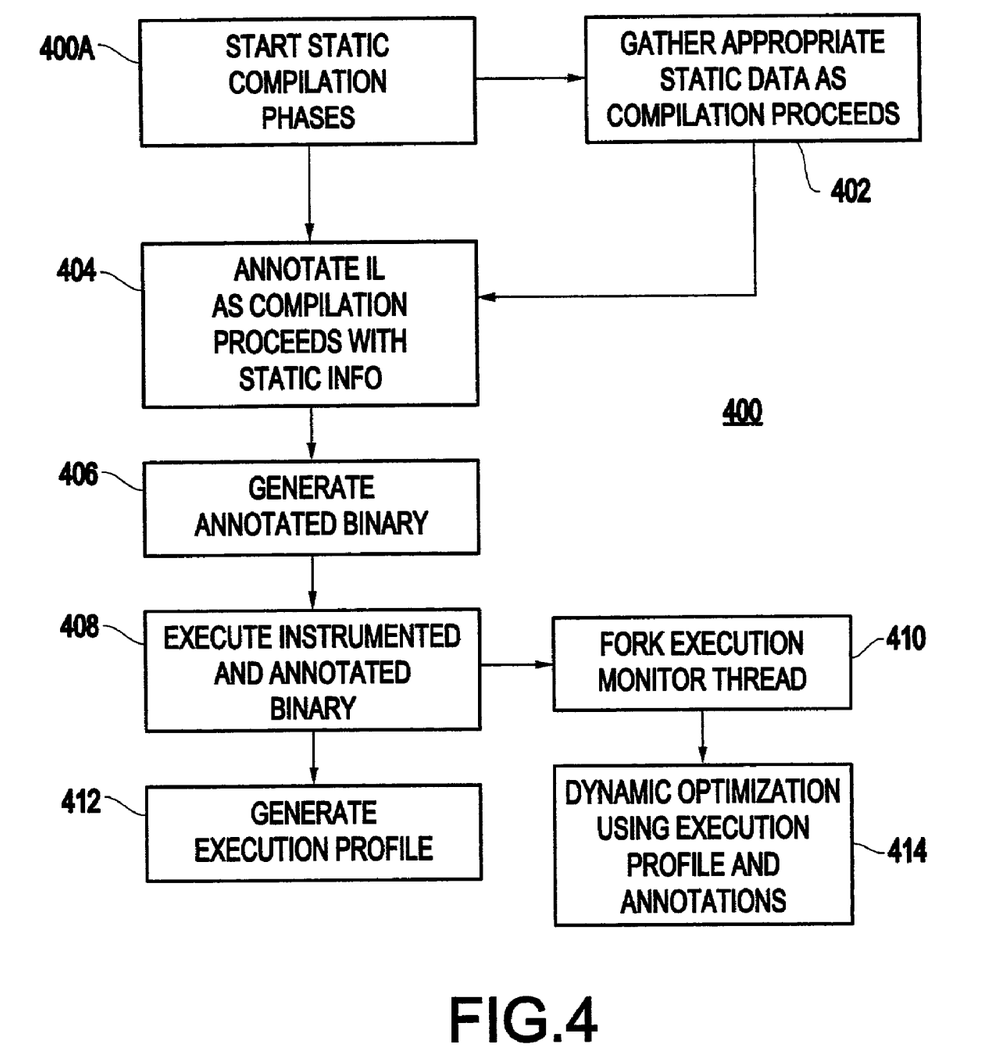
FIG. 4 is a flow diagram of an alternative embodiment of a process 400 for the dynamic optimizer of the present invention, which is adapted to take advantage of information gathered during a static optimization process, and specifically wherein data gathered at compile time is stored in the executable for use at runtime, by the dynamic optimizer component of the execution monitor.

In the method 400 of FIG. 4, additional steps are taken to perform a better optimization by dynamic optimizer 207. In this regard, additional information is provided to dynamic optimizer 207 in step 308 so that the optimizer can operate more rapidly and without the optimizer having to compute such information itself. Moreover, the optimizer can be provided possibly with information which it might otherwise find difficult to extract on its own.

Specifically, FIG. 4 shows a method 400 of dynamic optimization that makes use of information collected during static compilation of an application program. In accordance with this embodiment of the invention, the dynamic optimizer 207 can make use of information gathered about the instrumented binary at the time of compilation, which is referred to herein as the "static compilation stage" of the dynamic optimization process.

It is noted that the data/information generated by a static compiler is generally stored in an annotated binary, which may be an instrumented binary with an extension (e.g., an annotation attached thereto) to contain extra information.

The information that can be gathered during static optimization to assist in dynamic optimization may include flow graph information, particularly which labels are the targets of a given branch, static data dependencies whose runtime disambiguation could enable optimizations inhibited at compile time.

This embodiment could be especially beneficial to take advantage of details which may be more easily detected at compile time, therefore precluding costly runtime analysis.

Method 400 begins at step 400A of FIG. 4 with the insertion of instrumentation code into a compiled program in the manner described above with respect to FIG. 3. The annotations referred to above are generated at compile time by gathering static program information (and not profile data gathered by executing with a particular set of sample data).

Compilation proceeds and information is gathered at step 402 during the various phases of compilation such as the Front End, Optimization, Register Allocation and Final Assembly.

Step 404 represents annotation of the compiler's Intermediate Language (IL) at the various points where useful information is gathered.

In Step 406, the binary that is produced by the static compilation phase contains not only the instrumentation referred to throughout the disclosure above, but also the annotations produced at compile time. These annotations take the form of an encoded data string appended to the binary module.

Steps 410–414 proceed as described above in FIG. 3, with the difference that the information contained in the annotated binary is deployed by the dynamic optimization component of the execution monitor (shadow process) system. It is noted modifications are to the binary only, and are performed concurrently with the execution of the binary.

If no further static optimization is desired, then the information gathered at step 402 is used to create an annotation file to be attached to the instrumented binary at step 408. An example of such a file is shown in FIGS. 5A–5C.

Figure 5A:
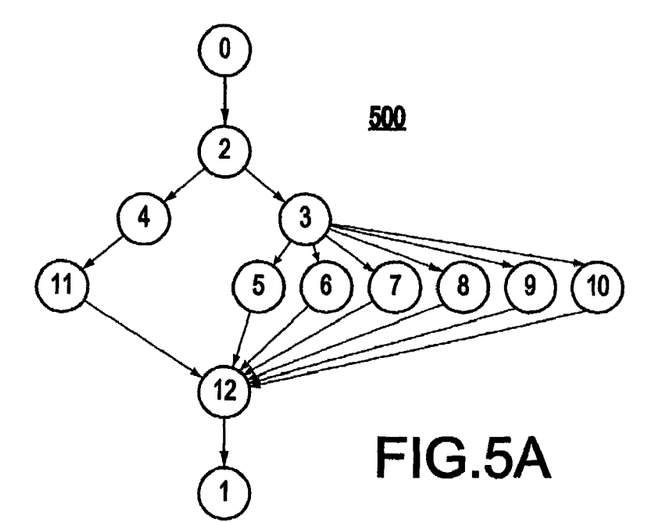
FIG. 5A illustrates a visual representation of a compile time data structure known as a Control Flow Graph.

Specifically, FIG. 5A illustrates a visual representation 500 of a compile time data structure known as a Control Flow Graph. Each node (i.e., 1–12) in the graph represents a basic block, and the directional lines represent successor edges connecting nodes. The program represented here includes a computed branch table.

Figure 5B:
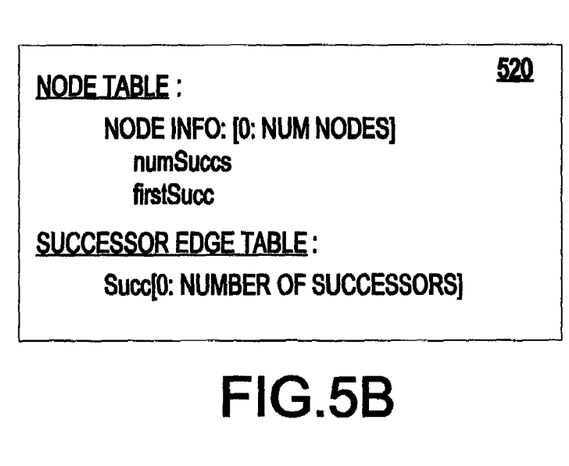
FIG. 5B illustrates an encoded representation of the flow graph which may form part of the annotated binary.

FIG. 5B illustrates an encoded representation 520 of the flow graph which may form part of the annotated binary.

Figure 5C:
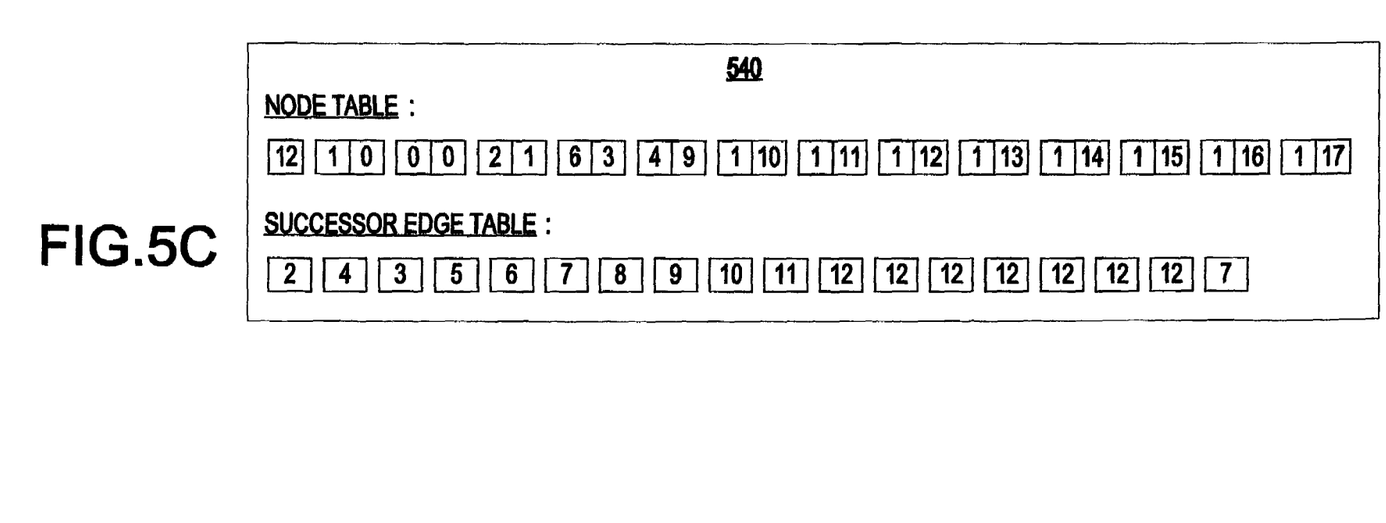
FIG. 5C represents the actual data which would be contained in the annotation file for the example of FIG. 5B.

FIG. 5C represents the actual data 540 which would be contained in the annotation file for this example. The dynamic optimizer 207 could potentially use this data to expeditiously reconstruct this graph at run time.

The annotated, instrumented binary is then ready for execution on a multiprocessor system equipped with a dynamic optimization tool 207 in accordance with the invention.

At step 408, the program is executed using actual user data on a first processor or set of processors, which spawns, at step 410, the execution monitor thread for the instrumented binary application on a different processor or set of processors than the one(s) executing the binary application itself.

At step 412, the dynamic optimizer uses the annotations produced during static optimization, along with the information generated by the instrumentation included in the executing binary to generate an improved optimized binary, as described above with respect to steps 302–312 of FIG. 3, as modified to take advantage of the annotations.

Third Embodiment

Figure 6:
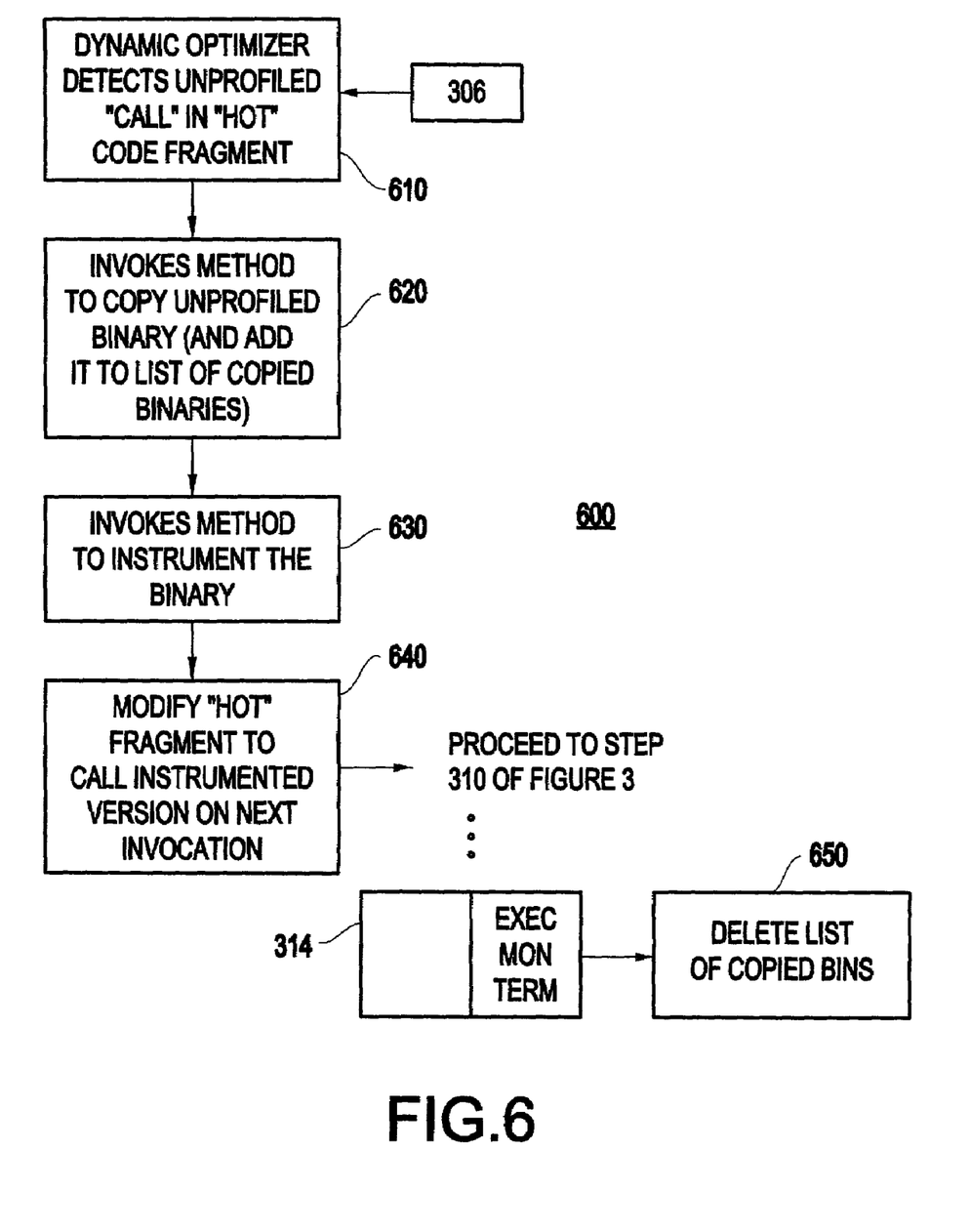
FIG. 6 illustrates a further embodiment of the invention, which allows dynamic optimization of binary applications that were not instrumented during static optimization.

Turning to a flowchart of a process 600 in FIG. 6, another embodiment of the dynamic optimization system in accordance with the invention includes the capability for detection of, during execution of a binary application to be optimized, certain non-instrumented modules of the binary application which have previously been executed frequently.

If such modules are detected (step 610), the invention provides for the automatic insertion of instrumentation code for subsequent monitoring and optimization. It is noted that the contents of FIG. 6 can be seen as a special case of optimization, and logically the steps of FIG. 6 fit between box 306 and box 312 in FIG. 3.

To avoid modifying code which might be potentially "shared" among other applications, in step 620, the system makes a copy of the original module (unprofiled binary) and maintains a list of any modules so changed.

Then, step 630 invokes the method to instrument the binary. On a future invocation of the module, the monitor can switch immediately to the instrumented version and execute it to produce the profile to be read by the execution monitor (step 640). That is, step 640 modifies the "hot" fragment to call the instrumented version on the next invocation.

Then, the method proceeds to step 310 in FIG. 3 and so forth until the execution terminates in step 314 at which time in step 650, the list of copied binaries is deleted.

This technique allows for the instrumentation of components whose compilation is not feasible, for example because source code is unavailable. Binary runtime libraries are an example of such a component that could be optimized in this way.

A further application of this aspect of the invention allows legacy (i.e., non-instrumented) binaries to enjoy the benefits of architectural enhancements or improvements in processor organization by the application of the described automatic recompilation techniques.

Fourth Embodiment

Figure 7:
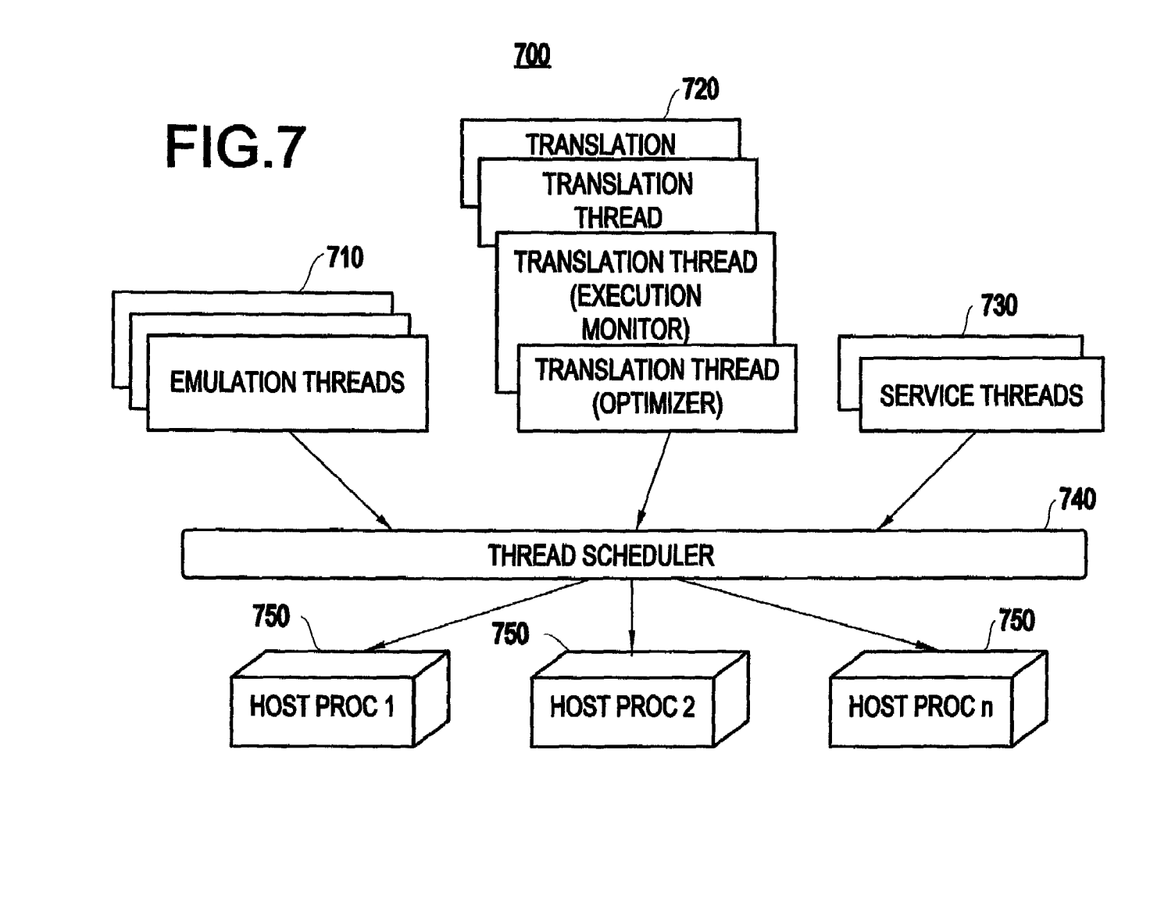
FIG. 7 illustrates an embodiment of the present invention as used with an emulator such as that described in the above-mentioned U.S. patent application Ser. No. 10/244,434.

In another embodiment of the invention, as shown in FIG. 7, the instrumented binary is produced in the process of dynamically translating the instructions stream of a target application, for execution on a host system as described in the above-mentioned U.S. patent application Ser. No. 10/244,434 to Nair et al. FIG. 7 illustrates system 700 which includes emulation threads 710, translation threads 720, and service threads 730 which are scheduled by a thread scheduler 740 for host processor(s) 750.

In this embodiment as shown in FIG. 7, the emulation system 700 is provided the execution monitor thread in which is an integral part of the emulation system 700, being one of the translation threads 720. One or more of the translation threads are employed to dynamically optimize the code fragments selected by the execution monitor.

In the system 700 of FIG. 7, sequences of code with frequent execution are subject to dynamic optimization to enhance performance. Such sequences are identified by the instrumentation code inserted by the Interpreter Translation thread which employs counters to keep track of execution frequency of cached code. Monitor threads continually track the value of these counters, and when a certain threshold is reached, signal the optimizer thread that (more) optimization may be profitable for a given code sequence, and indicates the (emulated) real address of the guest instruction that introduced the code sequence to be optimized.

In addition to the hardware/software environment described above, a different aspect of the invention includes a computer-implemented method for performing the above methods. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within a CPU, as represented by the fast-access storage for example. Alternatively, the instructions may be contained in another signal-bearing media, such as a magnetic data storage diskette 800 (FIG. 8), directly or indirectly accessible by the CPU.

Figure 8:
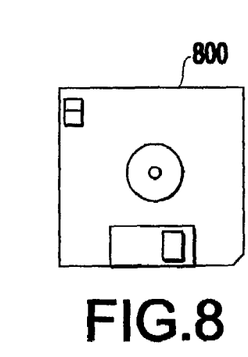
FIG. 8 illustrates a signal bearing medium 800 (e.g., storage medium) for storing steps of a program of the method according to the present invention.

Whether contained in the diskette 800, the computer/CPU, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of several preferred embodiments, those skilled in the art will recognize that the invention can be practiced with modification within the spirit and scope of the appended claims.

For example, as mentioned above, the invention is not limited to a shared multiprocessor systems (SMPs), but could also be advantageously in a distributed multiprocessor system.

Further, it is noted that Applicant's intent is to encompass equivalents of all claim elements, even if amended later during prosecution.

What is claimed is:

1. A method of transparent dynamic optimization in a multiprocessing system, comprising:

monitoring execution of an application binary on a first processor with an execution monitor running on another processor of the system;

transparently optimizing one or more segments of the original application binary with a runtime optimizer executing on said another processor of the system; and simultaneously modifying execution application binary replacing one or more segments with a recently optimized segment.

2. The method of claim 1, further comprising:

executing an instrumented copy of the application binary on said first processor in the system.

3. The method of claim 1, wherein said monitoring is conducted with reference to execution characteristics produced by executing instrumented code included in an instrumented copy of the application binary.

4. The method of claim 1, wherein said optimization is conducted with reference to execution characteristics gathered by the execution monitor, and without performance impact to the concurrently executing application binary.

5. The method of claim 1, wherein said modification is conducted in a manner that is transparent to a user of the application binary.

6. The method of claim 1, further comprising:

removing an instrumentation code from an optimized portion before inserting into the executing application binary.

7. The method of claim 1, further comprising determining, by instrumentation, the one or more segments to have been frequently executed.

8. The method of claim 1, further comprising:

inserting new instrumentation into an optimized portion to continue to monitor execution characteristics of the recently optimized application binary.

9. The method of claim 1, wherein the optimizing includes removing unnecessary branching from a frequently executed code path.

10. The method of claim 1, wherein the optimizing includes specializing an application binary to exploit a full architectural power of a particular network node on which it is running.

11. The method of claim 1, wherein the application binary includes profiling instructions and program data gathered at compile time and stored in the binary for use by said runtime optimizer.

12. The method of claim 1, wherein at least portions of the executing application binary are not previously instrumented.

13. The method of claim 12, wherein said at least portions include at least one of a legacy binary without a source code, and a shared runtime library, said method further comprising:

monitoring frequently executing binaries;

analyzing said binaries, and making a copy in which to insert appropriate instrumentation code; and on a future invocation of said binary, switching to an instrumented copy and proceeding with execution thereof.

14. The method of claim 13, wherein said binaries are analyzed while not being executed.

15. The method of claim 1, wherein said system includes a cluster of nodes communicating via distributed shared memory.

16. The method of claim 1, wherein said system includes a shared multiprocessor system (SMP).

17. The method of claim 2, wherein the instrumented application binary is produced during a process of dynamically translating an instruction stream of a target application, for execution on a host system.

18. A method for a multiprocessor computing environment to perform simultaneous, dynamic optimization of an application with respect to its execution environment, comprising:

executing an instrumented copy of the application on a first processor in the system;

monitoring the execution of the application with an execution monitor running on another processor of the system, said monitoring being conducted with reference to the execution characteristics produced by executing instrumentation code included in the instrumented copy of the application;

optimizing one or more segments of the original application with a runtime optimizer executing on another processor of the system, said optimization being conducted with reference to execution characteristics gathered by the execution monitor, and without performance impact to the concurrently executing application;

modifying the original execution application by replacing one or more segments with the recently optimized segment, said modification being conducted in a manner that is transparent to a user of the application.

19. A method for performing simultaneous, dynamic optimization of an application with respect to its execution environment, in a multiprocessor system, comprising:

monitoring each execution of a program or application running in a first processor, by an execution monitor, running in a separate processor or as a separate process running across multiple processors;

creating, by binary code as it executes, a profile data of execution characteristics of said binary code, said binary code containing instrumentation code for monitoring performance;

continuously evaluating, by said execution monitor, the profile data; and when a given threshold condition is satisfied, invoking a dynamic optimizer to optimize frequently executing code fragments, said optimized code fragments being inserted in the executing instruction stream for use in a subsequent execution thereof.

20. The method of claim 19, wherein excess processing cycles in the multiprocessor system are used to observe execution characteristics of the executing application, and transparently modify the executing application to improve its performance.

21. The method of claim 19, wherein a newly inserted code fragment contains no instrumentation.

22. The method of claim 19, wherein a newly inserted code fragment contains re-instrumented code to detect further changes in the execution characteristics of the application.

23. A method of transparent dynamic optimization in a shared multiprocessing (SMP) system, comprising:
  executing an application binary on a first processor;
  monitoring, on another processor in the system, a behavior of the execution; and
  optimizing the execution of the application binary while the application binary is executing.

24. The method of claim 23, wherein said application binary is instrumented.

25. The method of claim 23, wherein at least some of the application binary is not previously instrumented.

26. A system for transparent dynamic optimization in a multiprocessing system, comprising:
  an execution monitor for monitoring execution of an application binary on a first processor, said execution monitor running on another processor of the system,
  said execution monitor including a dynamic optimizer for simultaneously, with said monitoring, optimizing one or more segments of the original application binary, said optimizer executing on said another processor of the system.

27. The system of claim 26, wherein said execution monitor includes a fragment cache for storing dynamically re-optimized fragments of the instrumented binary application.

28. The system of claim 26, wherein said execution monitor performs the monitoring with reference to execution characteristics produced by executing instrumentation code included in an instrumented copy of the application binary.

29. The system of claim 26, wherein said dynamic optimizer performs the optimization with reference to execution characteristics gathered by the execution monitor, and without performance impact to the concurrently executing application binary.

30. The system of claim 26, wherein said execution monitor simultaneously modifies the original execution application binary by replacing one or more segments with a recently optimized segment.

31. The system of claim 30, wherein said modification is conducted in a manner that is transparent to a user of the application binary.

32. The system of claim 26, wherein said execution monitor removes the instrumentation code from an optimized portion before inserting into the executing application binary.

33. The system of claim 26, wherein said execution monitor inserts new instrumentation into an optimized portion to continue to monitor execution characteristics of the recently optimized application binary.

34. The system of claim 26, wherein the dynamic optimizer removes unnecessary branching from a frequently executed code path.

35. The system of claim 26, wherein the dynamic optimizer specializes an application binary to exploit a full architectural power of a particular network node on which it is running.

36. The system of claim 26, wherein the application binary includes profiling instructions and some program data gathered at compile time and stored in the binary for use by said dynamic optimizer.

37. The system of claim 26, wherein at least portions of the executing application binary are not previously instrumented.

38. The system of claim 37, wherein said at least some portions include at least one of a legacy binary without a source code, and a shared runtime library, said system further comprising:
  means for monitoring frequently executing binaries;
  means for analyzing said binaries, and making a copy in which to insert appropriate instrumentation code; and
  means, on a future invocation of said binary, for switching to an instrumented copy and proceeding with execution thereof.

39. The system of claim 38, wherein said binaries are analyzed while not being executed.

40. The system of claim 26, further including a cluster of nodes communicating via distributed shared memory.

41. The system of claim 26, wherein said system includes a shared multiprocessor (SMP) system.

42. The system of claim 27, wherein an instrumented application binary is produced during a process of dynamically translating an instruction stream of a target application, for execution on a host system.

43. The system of claim 26, wherein said execution monitor is dedicated to said first processor.

44. The system of claim 27, wherein said execution monitor further includes:
  a fragment manager for managing fragments in said fragment cache; and
  a profile monitor which is triggered by the executing application binary when a predetermined condition is met to provide an input to the fragment manager,
  wherein the dynamic optimizer passes optimized fragments back to the fragment cache via the fragment manager,
  wherein the execution monitor decides which portion of the application binary to extract for optimization, and extracts said portion of the application binary by making a copy of the instructions, and storing the instructions such that the dynamic optimizer can refer to and make changes to the copy,
  wherein said execution monitor provides profile information to the dynamic optimizer which is relevant for optimizing a specific fragment.

45. A machine-readable data storage medium tangibly embodying a program of machine-readable instructions executable by a digital processing apparatus to perform a method of transparent dynamic optimization in a multiprocessing system, comprising: monitoring execution of an application binary on a first processor with an execution monitor running on another processor of the system; and transparently optimizing one or more segments of the original application binary with a runtime optimizer executing on said another processor of the system.

* * * * *